Feb. 18, 1930.  A. SAMUEL  1,747,794
MACHINE FOR PLACING AND IRONING SHEET MATERIAL
Filed Nov. 2, 1928
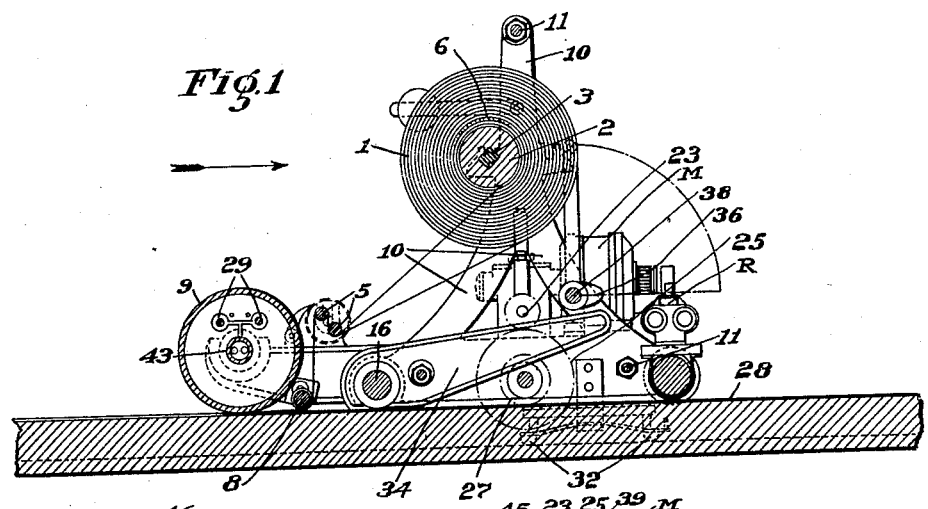
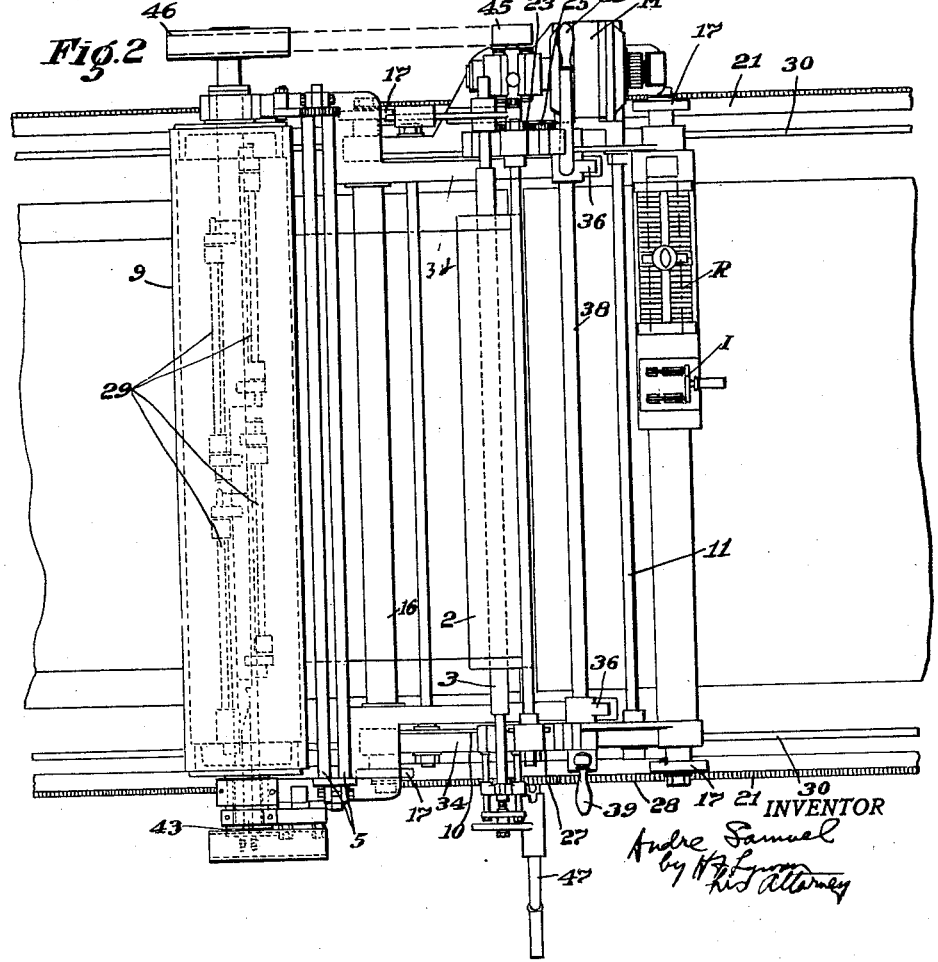

Patented Feb. 18, 1930

1,747,794

UNITED STATES PATENT OFFICE

ANDRÉ SAMUEL, OF LYON, FRANCE, ASSIGNOR, BY MESNE ASSIGNMENTS, TO SAMUELS PROCESS CORPORATION, OF BOSTON, MASSACHUSETTS, A CORPORATION OF MASSACHUSETTS

MACHINE FOR PLACING AND IRONING SHEET MATERIAL

Application filed November 2, 1928. Serial No. 316,781.

This invention relates to a machine for placing sheet material, such as fabric (textile or felted) paper or the like, upon a printing table and stretching and smoothing the material thereon so as to leave it smoothly laid without wrinkles. Fabric or cloth is commonly handled in rolls and in order to print the same upon a printing table, it has heretofore been necessary to do this by hand, which is a difficult operation to perform evenly upon a table which has been coated or otherwise treated with an adhesive so as to cause the fabric to adhere to the table when laid thereon. This machine is able to accomplish the placing of a strip of material upon a printing table in a smooth and uniform manner and to iron it thereon so as to dry the adhesive and present a firm, smooth, even surface for printing.

In the drawings:

Fig. 1 is a side elevation of the machine shown placing the fabric upon the table from a roller thereof; and Fig. 2 is a plan view of the same.

Referring to the drawings,

The machine embodies a carriage adapted to be rolled along the printing table, the carriage in its essentials including side frame members 10 which are suitably spaced and held by means of cross or tie rods 11. The frame of the machine is carried upon the four wheels 17 mounted upon the axles 16 so as to enable the carriage to be rolled along the printing table with the wheels 17 contacting with the rails placed along the opposite edges of the printing table. On the frame where the carriage is mounted an upper axle 3 carrying a wood roller 2 upon which the material or fabric has been rolled. The fabric is led from the outside of the roll to and through and between a pair of guiding and tensioning bars 5 which may be so adjusted as to maintain a suitable tension upon the roll of fabric. These bars, as will be evident, act to guide the fabric in its passage to the table. The roll is restrained from freely turning by means of the weighted lever 6 which contacts with the axle 3 so as to prevent it from freely turning. From the bars 5 the fabric is led down and around the cross member 8, thereby to lay the fabric under tension on the printing table. From the member 8 the fabric is led under the metallic, smoothing cylinder 9. The cylinder 9 bears upon the fabric which is maintained under tension by the machine, the starting end of the fabric having been suitably attached to the table by means not shown. The cylinder 9 may be heated in any one of several ways, for example, it may be secured by the introduction of a hot iron bar into the iron cylinder, or by means of gas or gasolene jets, or in any other similar form. In the particular examples shown in the drawings the heat is produced by means of the electrical heating units 29 mounted and carried by an upward extension from the hollow tube which is suitably fixed and held so as not to be rotated with the cylinder 9.

The movement or translation of the machine along the printing table T is produced by means of the motor M through the medium of suitable shafting and gearing. The movement of the motor is thus imparted to the gear 23 which meshes with the gear 25, this gear in turn driving smaller gears 27 concentric therewith, the smaller gears 27 carried on the same shaft. The gears 27 mesh with the racks 28 along the sides of the printing table T. The rate of movement of the machine may be varied in its speed by means of the motor M through the aid of the rheostat R. The carriage may be returned to its starting position either by means of a suitable reversing switch (not shown) or by means of the handle 47. The speed of advance of the machine when it is placing the fabric on the table is regulated so that the fabric will be sufficiently dry without being burned by too slow a movement of the machine along the table.

If, for any reason, it is desired to stop the carriage of the machine at any point along the table, the heated roller may be lifted from the fabric by means of the two cams 36 carried on the shaft 38 which may be actuated by the lever 39. The two cams, as may be seen from the drawings, especially Fig. 1, are adapted to be rotated so as to bear down on the ends of the two levers 34 fulcrumed on shaft 16 so as to lift the roll 9 from the fabric since the roll 9 is carried at the other end of the respective levers.

It is important that some means be provided for uniformly heating the ironing roll before starting to place cloth upon the table, and in the particular embodiment shown in the drawings the roll is uniformly heated before it is brought in contact with the fabric. This is accomplished by means of rotating the cylinder before it is brought in contact with the fabric through the pulley 45 driving the pulley 46 by means of the belt as shown, the pulley 46 being fixed to and adapted to rotate the roll 9. After the cylinder 9 has become warmed, it is lowered and the actual placing of cloth along the table may be commenced. The current necessary for heating and for the movement of the machine along the printing table may be supplied by means of the electrical conductors 30 carried along the sides of the tables, contact with which conductors is established by means of the brushes 32 carried on the frame of the machine.

By the use of the word "fabric" in the appended claims I do not of course confine myself to what is strictly and technically fabric such as, for example, textile fabric.

Having described my invention, what I wish to claim and secure by Letters Patent is:—

1. In an apparatus for preparing and holding fabric for printing, an elongated printing table, a carriage adapted to be moved along said table, means attached to said carriage for guiding and tensioning a strip of fabric supplied thereto, means to lay said fabric or the table, and smoothing means attached to said carriage adapted to prevent wrinkles in the fabric laid upon said table.

2. In an apparatus for preparing and holding fabric for printing, an elongated printing table, a carriage adapted to be moved along said table, means attached to said carriage for guiding and tensioning a strip of fabric supplied thereto, means to lay said fabric on the table, and heated smoothing means attached to said carriage adapted to prevent wrinkles in the fabric laid upon said table.

3. In an apparatus for preparing and holding fabric for printing, an elongated printing table, a carriage adapted to be moved along said table, means attached to said carriage for guiding and tensioning a strip of fabric supplied thereto, means to lay said fabric on the table, and electrically heated smoothing means attached to said carriage adapted to prevent wrinkles in the fabric laid upon said table.

4. In an apparatus for preparing and holding fabric for printing, an elongated printing table, a carriage adapted to be moved along said table, and carry a roll of fabric therealong, means for guiding and tensioning the fabric supplied from the roll, means to lay said fabric on the table, and smoothing means attached to said carriage adapted to prevent wrinkles in the fabric laid upon said table.

5. In an apparatus for preparing and holding fabric for printing, an elongated printing table, a carriage adapted to be moved along said table, and carry a roll of fabric therealong, means for guiding and tensioning the fabric supplied from the roll, means to lay said fabric on the table, and heated smoothing means attached to said carriage adapted to prevent wrinkles in the fabric laid upon said table.

6. In an apparatus for preparing and holding fabric for printing, an elongated printing table, a carriage, automatic means to move said carriage along said table, means attached to said carriage for guiding and tensioning a strip of fabric supplied thereto, means to lay said fabric on the table, and smoothing means attached to said carriage adapted to prevent wrinkles in the fabric laid upon said table.

7. In an apparatus for preparing and holding fabric for printing, an elongated printing table, a carriage adapted to be moved along said table, means for guiding and tensioning a strip of fabric supplied thereto, means to lay said fabric on the table, and a roller attached to said carriage adapted to prevent wrinkles in the fabric laid upon said table.

8. In an apparatus for preparing and holding fabric for printing, an elongated printing table, a carriage adapted to be moved along said table, means for guiding and tensioning a strip of fabric supplied thereto, means to lay said fabric on the table, and a heated roller attached to said carriage adapted to prevent wrinkles in the fabric laid upon said table.

9. In an apparatus for preparing and holding fabric for printing, an elongated printing table, a carriage adapted to be moved along said table, adjustable means for guiding and tensioning a strip of fabric supplied thereto, means to lay said fabric on the table, and a roller attached to said carriage adapted to prevent wrinkles in the fabric laid upon said table.

10. In an apparatus for preparing and holding fabric for printing, an elongated printing table, a carriage adapted to be moved along said table, means for guiding and tensioning a strip of fabric supplied thereto, means to lay said fabric on the table, a roller attached to said carriage adapted to prevent wrinkles in the fabric laid upon said table, and means for lifting said roller from an operative position.

11. In an apparatus for preparing and holding fabric for printing, an elongated printing table, a carriage adapted to be moved along said table, adjustable means for guiding and tensioning a strip of fabric supplied thereto, means to lay said fabric on the table, and a heated roller attached to said carriage adapted to prevent wrinkles in the fabric laid upon said table.

12. In an apparatus for preparing and holding fabric for printing, a carriage adapted to be moved along a table, means for guiding and tensioning a strip of fabric supplied from a roll carried by the carriage, means to lay said fabric on the table, a heated roller attached to said carriage adapted to prevent wrinkles in the fabric laid and rolled, and means for lifting said roller from operative position.

13. In an apparatus for preparing and holding fabric for printing, an elongated printing table, racks along both sides of said table, a carriage, means to move said carriage along said table, including a gear carried by said carriage adapted to mesh with said racks, means attached to said carriage for guiding and tensioning a strip of fabric supplied thereto, means to lay said fabric on the table, and a roller attached to said carriage adapted to prevent wrinkles in the fabric laid upon the table.

14. In an apparatus for preparing and holding fabric for printing, an elongated printing table, racks along both sides of said table, a carriage, means to move said carriage along said table, including a gear carried by said carriage adapted to mesh with said racks, and automatic means for driving said gear, means attached to said carriage for guiding and tensioning a strip of fabric supplied thereto, means to lay said fabric on the table, and a roller attached to said carriage adapted to prevent wrinkles in the fabric laid upon the table.

15. In an apparatus for preparing and holding fabric for printing, an elongated printing table, a carriage adapted to be moved along said table, means for guiding and tensioning a strip of fabric thereto, means to lay said fabric on the table, a smoothing roller attached to said carriage and adapted to prevent wrinkles in the fabric laid upon the table, and an arm fulcrumed on the carriage and engageable with said smoothing roller to lift said roller from an operative position.

16. In an apparatus for preparing and holding fabric for printing, an elongated printing table, a carriage adapted to be moved along said table, means for guiding and tensioning a strip of fabric thereto, means to lay said fabric on the table, a smoothing roller attahced to said carriage and adapted to prevent wrinkles in the fabric laid upon the table, and a cam controlled arm fulcrumed on the carriage and engageable with said smoothing roller to lift said roller from an operative position.

17. An apparatus for preparing and holding fabric for printing, an elongated printing table, a carriage, automatic means cooperative with the table to move said carriage along said table, means attached to said carriage for guiding and tensioning a strip of fabric supplied thereto, means to lay the fabric on the table, smoothing means attached to said carriage adapted to prevent wrinkles in the fabric laid upon said table, said automatic means including a source of electric current in the table, a contact between the carriage and the table, and a control on the carriage for regulating the supply of current to the carriage.

ANDRÉ SAMUEL.